United States Patent [19]
McTamaney et al.

[11] 3,741,683
[45] June 26, 1973

[54] LIQUID LEVEL CONTROL SYSTEM

[75] Inventors: Louis S. McTamaney, San Jose; Robert A. Begun, Los Gatos, both of Calif.

[73] Assignee: FMC Corporation, San Jose, Calif.

[22] Filed: July 2, 1971

[21] Appl. No.: 159,325

[52] U.S. Cl. .................... 417/7, 318/102, 318/103, 318/482, 318/642, 137/392
[51] Int. Cl. ........................................... F04b 41/06
[58] Field of Search .................... 318/102, 103, 482, 318/642; 137/392; 417/7, 8, 12, 44, 45

[56] References Cited
UNITED STATES PATENTS

| | | | |
|---|---|---|---|
| 2,482,496 | 9/1949 | McGillivray | 318/482 |
| 3,005,411 | 10/1961 | Metz | 417/12 |
| 3,223,041 | 12/1965 | Quinn | 417/12 |
| 3,285,181 | 11/1966 | Howard | 417/8 |
| 3,408,941 | 11/1968 | Sorensen | 417/45 |

FOREIGN PATENTS OR APPLICATIONS

| | | | |
|---|---|---|---|
| 1,191,364 | 2/1968 | Great Britain | 318/102 |

Primary Examiner—William L. Freeh
Assistant Examiner—John T. Winburn
Attorney—F. W. Anderson and C. E. Tripp

[57] ABSTRACT

A liquid level control system has two motorized pumps for emptying a tank. Three electric probes at staggered heights provide liquid level signals to a control circuit, which circuit embodies a flip-flop memory, a signal switching alternator and two logic channels, one for each pump motor. When the liquid level rises to ground out both the first and second probes, the memory flips and a pre-selected pump is turned on. If the liquid rises to the third probe, the second pump is turned on. The alternator cannot be switched until the liquid drops below the first (lowest) probe, whereupon the memory is restored to its original condition. This switches the alternator so that the sequence of pump operation on the next rising cycle is reversed. This circuitry insures 50 percent pump alternation even though the liquid fluctuates about the first probe without reaching the second probe.

9 Claims, 18 Drawing Figures

FIG_7

FIG_8

FIG_9

FIG_13

FIG_14

FIG_15

FIG. 16

FIG_17

LIQUID LEVEL CONTROL SYSTEM

FIELD OF THE INVENTION

This invention relates to liquid handling and more specifically to liquid level responsive systems for controlling the liquid level in a tank or the like.

DESCRIPTION OF THE PRIOR ART

The united States patent to Cook No. 2,042,169, issued May 26, 1936, discloses a liquid level control system which provides for alternate pump operation as well as for bringing a second pump into operation simultaneously with a first pump in accordance with the general objectives of the present invention. However, the Cook system is electromechanical in that there is a single probe in form of a float which has two sets of contacts slidably mounted on float rods. When the float rises to close the first contact, the circuit functions to energize one of the pump motors and to switch the alternator. If the float rises higher to close the second set of contacts, this energizes the other pump motor. The Cook patent does not employ electric probes wherein the lowermost probe cannot, in and of itself, start the pump operating but must be deactivated by the liquid before any pumps that have been energized will be turned off.

The united States patent to Martin No. 2,797,702, issued July 2, 1957 discloses a liquid level control having three staggered probes of the grounding type, wherein three pumps are successively energized as the liquid rises and correspondingly successively de-energizes as the liquid falls.

It has been proposed to provide an electric probe liquid level control system generally in accordance with the principles of the aforesaid cook U.S. Pat. No. 1,031,169. In the proposal, the probes are of the capacity switch type and operate electro-mechanical relays interconnected to turn on one pump when the liquid reaches the second probe and a second pump when the liquid reaches a third probe. In this system, the alternator is actuated by the first probe, whereas the motor is not turned on until a second probe is reached. Thus, if the liquid level randomly falls above and below the first probe, the alternator is switched for each excursion, the result being that perfect 50 percent alternation of the pump motors is not attainable.

SUMMARY OF THE INVENTION

The present invention provides a liquid level control system of the type wherein three simple electric probes are provided. These probes are connected to a memory circuit in addition to the alternator, and logic circuits provide power signals for starting the pumps. When the liquid rises to the first probe, nothing happens except that the memory is "set" or enabled but is not flipped. A rise to the second probe "flips" the memory which changes its state and turns on No. 1 pump, but although flipping the memory conditions the alternator for subsequent switching, it has no effect on the alternator output. If one pump is capable of removing liquid faster than it enters the tank, the liquid drops back below the second probe which again "sets" the memory and the liquid then drops back below the lowest probe which "restores" the memory to its original condition and turns pump No. 1 off. This restoration of the memory (but not the original flipping thereof) switches the alternator for Pump No. 2 operation on a subsequent cycle. It will be noted that the alternator cannot be switched until a pump has been turned on and has lowered the liquid level below the lowest probe and that no fluctuation of the liquid about the lowest probe will or can switch the alternator. This assures perfect 50 percent pump alternation.

Continuing the brief description of the cycle, if, in the previous case, the liquid had risen to the third probe, the other pump (No. 2) would have been turned on and the circuit is such that both pumps will now remain on until the liquid falls below the first probe. The cutting in of the second pump motor under these conditions has no effect on the alternator operation, which remains as previously described.

Other features of the invention reside in the use of solid state gates in the memory, alternator and logic circuits exclusively, whereby expensive and troublesome relays and relay contacts are completely eliminated. Another feature of the system relates in the manner of handling the power signals which is also accomplished without need for relays. The power signals are controlled by a uni-junction oscillator which, when running, oscillates at a much higher frequency than the AC line alternations and hence can control a controlled rectifier (traic) for each pump motor starter.

It is another feature of the invention that the utilization of gate circuits in the logic circuits provides means for latching the pumps in operation until the liquid falls below the lowest probe.

BRIEF DESCRIPTION OF THE DRAWINGS

FIG. 17 is a detailed table showing the inputs and outputs of the various gates and logic elements of the schematic diagram of FIG. 3, under the conditions selected in FIGS. 2 and 4 – 16.

GENERAL DESCRIPTION OF THE SYSTEM

Figure 1:
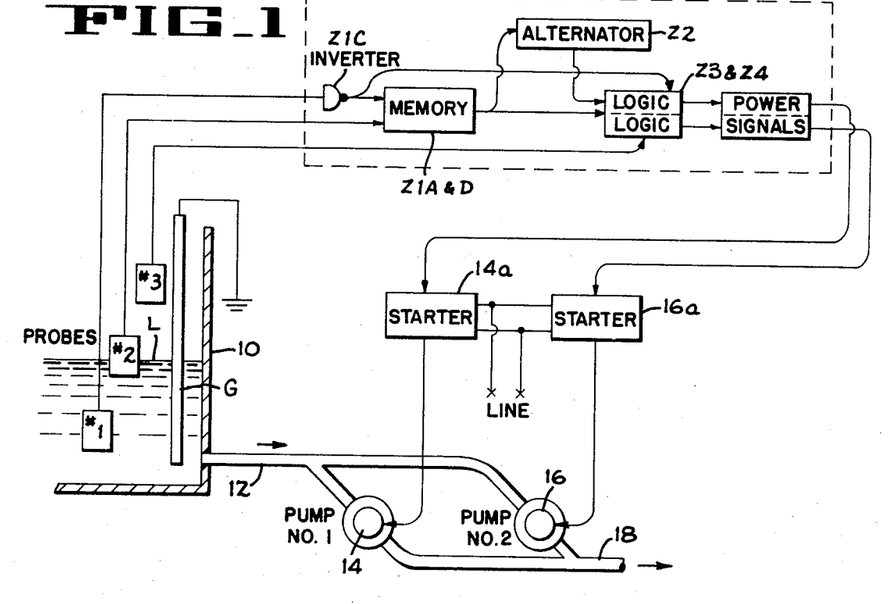
FIG. 1 is a block diagram of a system embodying the invention connected to lower the liquid level in a tank.

The circuit to be described in detail herein is connected to a system such as that shown in FIG. 1 wherein a pair of pumps is provided to prevent the liquid level from rising in a tank past a certain predetermined upper level.

Referring to FIG. 1, the body of liquid L is shown confined by means of a tank 10. Three probes at staggered heights are mounted in the tank and in the embodiment of the invention now being described, the lowermost probe is indicated as No. 1, the next highest or second probe as No. 2 and the highest or third probe as No. 3. These probes are electrically connected to the control circuit in a manner to be described in detail presently. A ground strip G is provided in the tank for grounding the probes through the liquid, but the tank itself may be grounded to serve this function. Liquid is withdrawn from the tank 10 by means of a discharge line 12 connected to a motorized pump 14, arbitrarily designated as pump No. 1 and a motorized pump 16, designated as pump No. 2. Both pumps discharge through a common line 18. Conventional motor starters 14a, 16a are connected to the power line for the motors of pumps 14 (No. 1) and 16 (No. 2), respectively. These starters, which are well known in the control art, energize and de-energize the pump motors in response to low current control signals.

The control circuit includes a solid state inverter gate Z1C connected between probe No. 1 and a flip flop memory circuit Z1A and Z1D. The memory also receives signals directly from Probe No. 2. The signal from the probe No. 1 inverter gate Z1C also enters a two channel logic circuit Z3 and Z4.

The output signal from the memory is directed to the logic circuit as well as to an alternator Z2. The output signals from the alternator are directed to the logic circuit. The channels Z3 and Z4 of the logic circuit provice output signals which operate power signal devices and these in turn are connected to the motor starters 14a, 16a, previously described. The mode of operation of the circuit indicated generally in FIG. 1 will be traced through several critical phases of operation in the schematic chart of FIG. 2 whereupon a detailed description of how the circuits of the present invention attain the results described will be presented, step by step.

Cycle Chart

Figure 2:
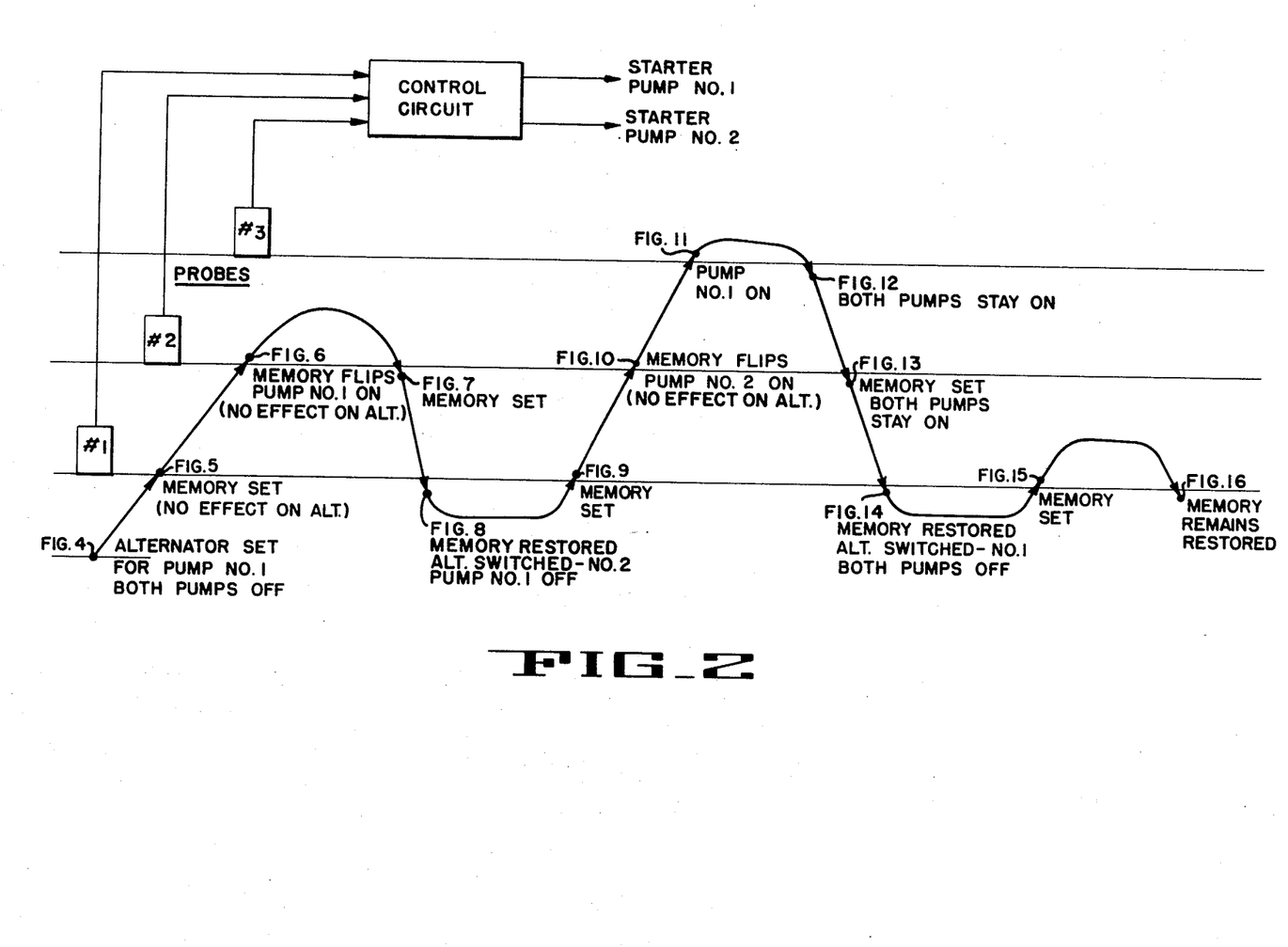
FIG. 2 is an operational chart of the system of FIG. 1 as it progresses through certain critical modes of operation. The key points on this chart are referred to in FIGS. 4 – 16.

Referring to FIG. 2, it will be assumed that the water level starts at the point designated "FIG. 4" on the chart, that is below the lowest probe No. 1 and hence, of course, below all the probes. In this description, it will be assumed that the alternator has been set up (by means to be described) to first operate pump No. 1 and that both pumps are off.

Figure 5:
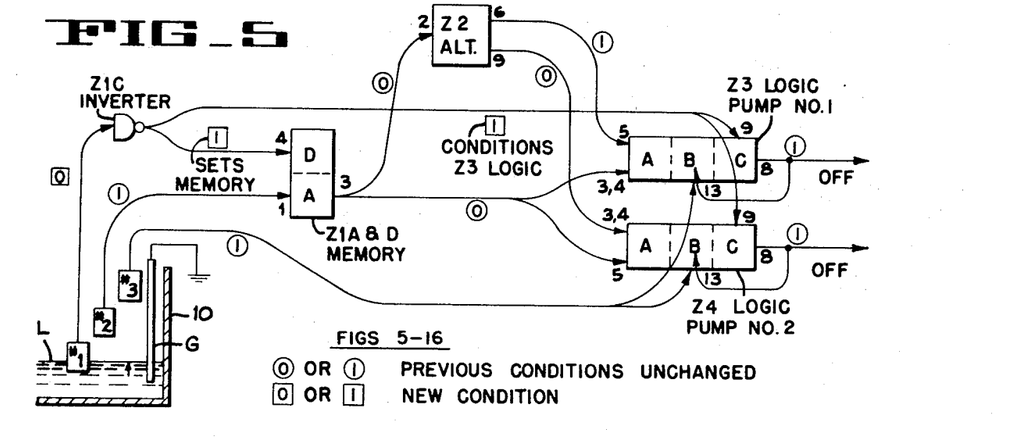

When the liquid rises to contact probe No. 1, the point designated as "FIG. 5," probe No. 1 is grounded to electrode G and the memory circuit will be "set." The term "set" is used in this description to indicate that the memory gates are enabled or conditioned in a manner whereby a second signal thereto will cause the memory to change its state which is referred to in the art as causing the memory to "flip." However, and as mentioned with the liquid rising to probe No. 1, the memory is only set.

Figure 6:
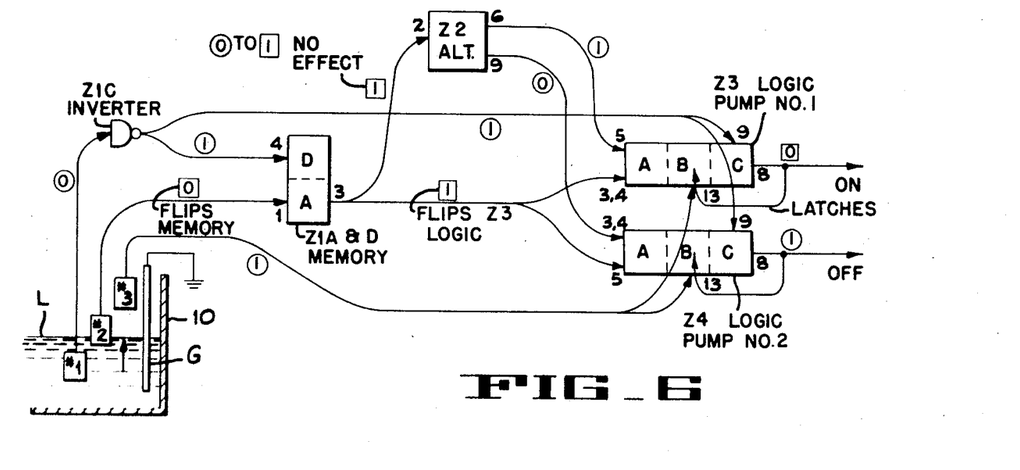

When the liquid reaches probe No. 2, this probe is also grounded to electrode G. which point is indicated as "FIG. 6." The resultant signal from probe No. 2 causes the previously set memory to flip and the rest of the circuit will have been so conditioned that this activates the logic channel Z3 for pump No. 1, causing a power signal to be generated to the pump starter 14a to turn on the pump. An important feature of the present invention is that although the aforesaid flipping of the memory that occurred when the rising liquid grounded probe No. 2 has no effect on the output of the alternator Z2, it does condition the alternator for subsequent switching of outputs.

It will now be assumed that the rate of liquid ingress to the tank 10 is less than the pumping capacity of a single pump, namely pump No. 1, now in operation. Thus, the liquid level will fall until it reaches a point indicated at "FIG. 7" on the chart of FIG. 2. The circuit is such that removal of the ground from probe No. 1 again sets or conditions the memory circuit, but this setting of the memory circuit does not change the memory input to the alternator.

As pumping continues, the liquid level will, under conditions assumed, fall below probe No. 1, thereby removing its ground. This point is indicated at "FIG. 8" and at this time the memory flips to its original state, which will be referred to as the "restored" state of the memory. The alternator circuit Z2, as shown in detail in the table of FIG. 17, is such that the flipping of the memory from its original state that occurred when probe No. 2 was grounded by the liquid (activated) does not switch the alternator, but the change in voltage of the memory output that occurs when the memory is restored by successive deactivation of probes NO. 1 and No. 2 will switch the alternator. Thus, when the liquid reaches the level designated at "FIG. 8" in the chart of FIG. 2, the alternator is switched. In the example being described, pump No. 2 will not be conditioned for energizing on the next cycle. At the same time, pump No. 1, which has previously been in operation, will be turned off.

Figure 9:
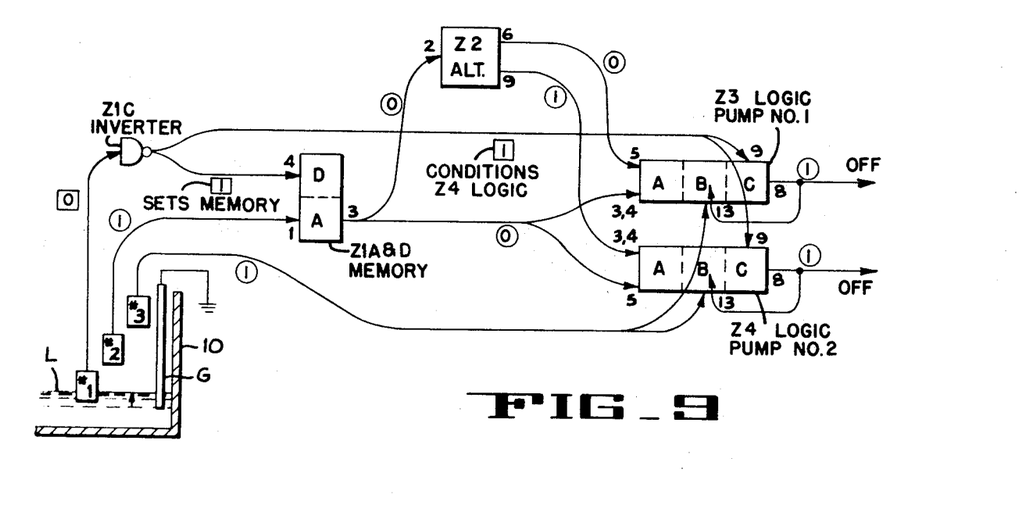

It will now be assumed that the liquid rises again and grounds probe No. 1 as indicated at "FIG. 9" in the chart. As before, the memory is now set, although it remains in its "restored" condition.

Figure 10:
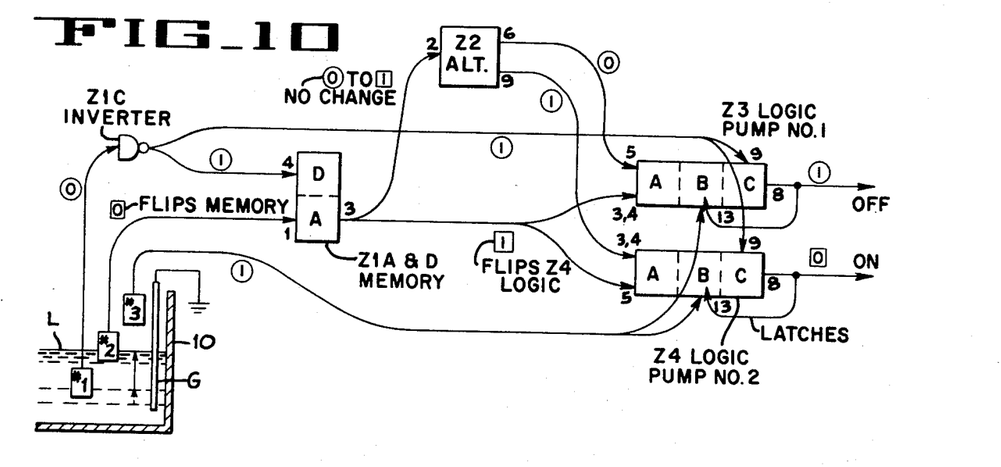

Assuming that the liquid rises until probe No. 2 has been grounded, the condition indicated at "FIG. 10" takes place, which corresponds to the condition previously indicated at "FIG. 6" except that the alternator has been switched for energization of pump No. 2. Thus, activation of probe No. 2 causes pump No. 2 to turn on, and as before, the memory flips. Also as before, this flipping of the memory has no effect on the alternator.

It will now be assumed that the capacity of pump NO. 2 (now running) cannot keep up with the influx of liquid to the tank. Thus, the liquid will rise until it grounds probe No. 3, the point indicated at "FIG. 11" in the chart of FIG. 2. This sends a signal to the logic channels and results in a power signal for the start 14a for pump No. 1 (previously off in this cycle) causing the pump to run and assist in lowering the liquid level.

Assuming that the liquid level now can be lowered by both pumps, it will fall below probe No. 3 which is the point indicated at "FIG. 12" on the chart. However, both logic circuits Z3 and Z4 have been latched to keep both pumps energized, even through probe No. 3 has been cleared by the liquid.

The liquid now drops below probe NO. 2 to the point indicated at "FIG. 13" on the chart. This sets the memory, as did the similar operation indicated at the point of "FIG. 7" on the chart. However, the latching circuits insure that both pumps stay on.

Figure 14:
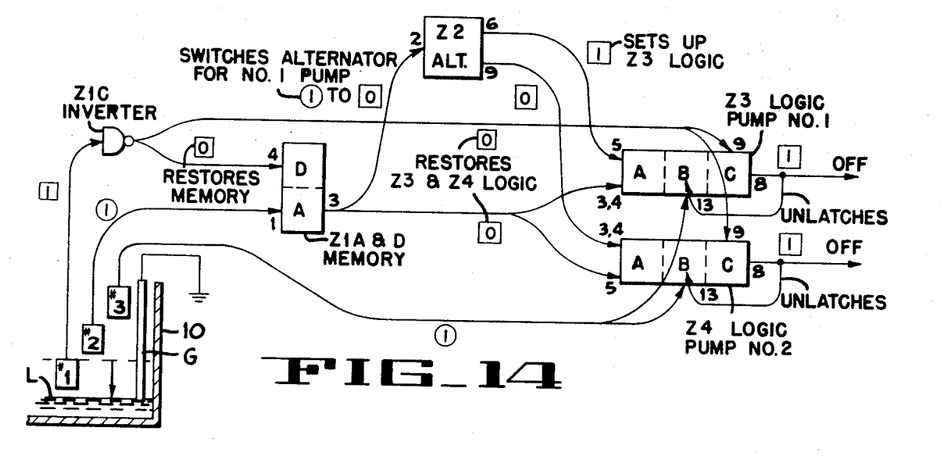

The liquid now falls below probe No. 1 to the point indicated at "FIG. 14" on the chart. As at the point indicated by "FIG. 8," the memory is now restored and the alternator is again switched, but this time it is switched back for subsequent operation of pump No. 1, also, when the water level drops below probe No. 1 both pumps are turned off.

It is a feature of the present invention that oscillation of the liquid around probe No. 1 cannot effect the alternator and that the latter can only be switched by having at least one pump turned on by probe No. 2 and turned off again, as previously described in connection with the points of FIG. 8 and 14 in the chart.

Figure 15:
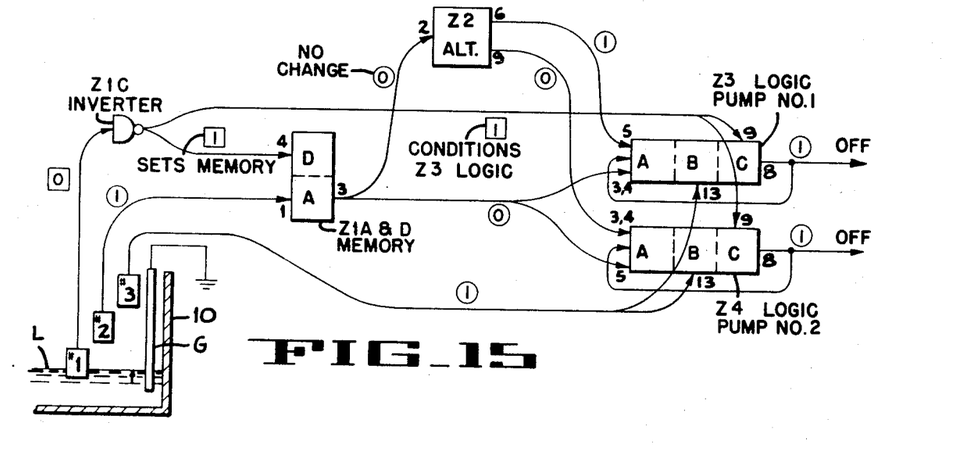

Thus, if the liquid rises to the point indicated at "FIG. 15" on the chart, the memory is set but remains in its "restored" condition and nothing happens. Similarly, if the liquid again falls below the probe No. 1 (without pump operation) as indicated at "FIG. 16" on the chart, the memory remains "restored," and there is no effect on the alternator, which was previously switched for No. 1 operation in our example. The result of this feature is that at least one pump must be turned on and off before the alternator is switched, thereby insuring 50 percent pump alternation.

Circuit Details

Figure 3:
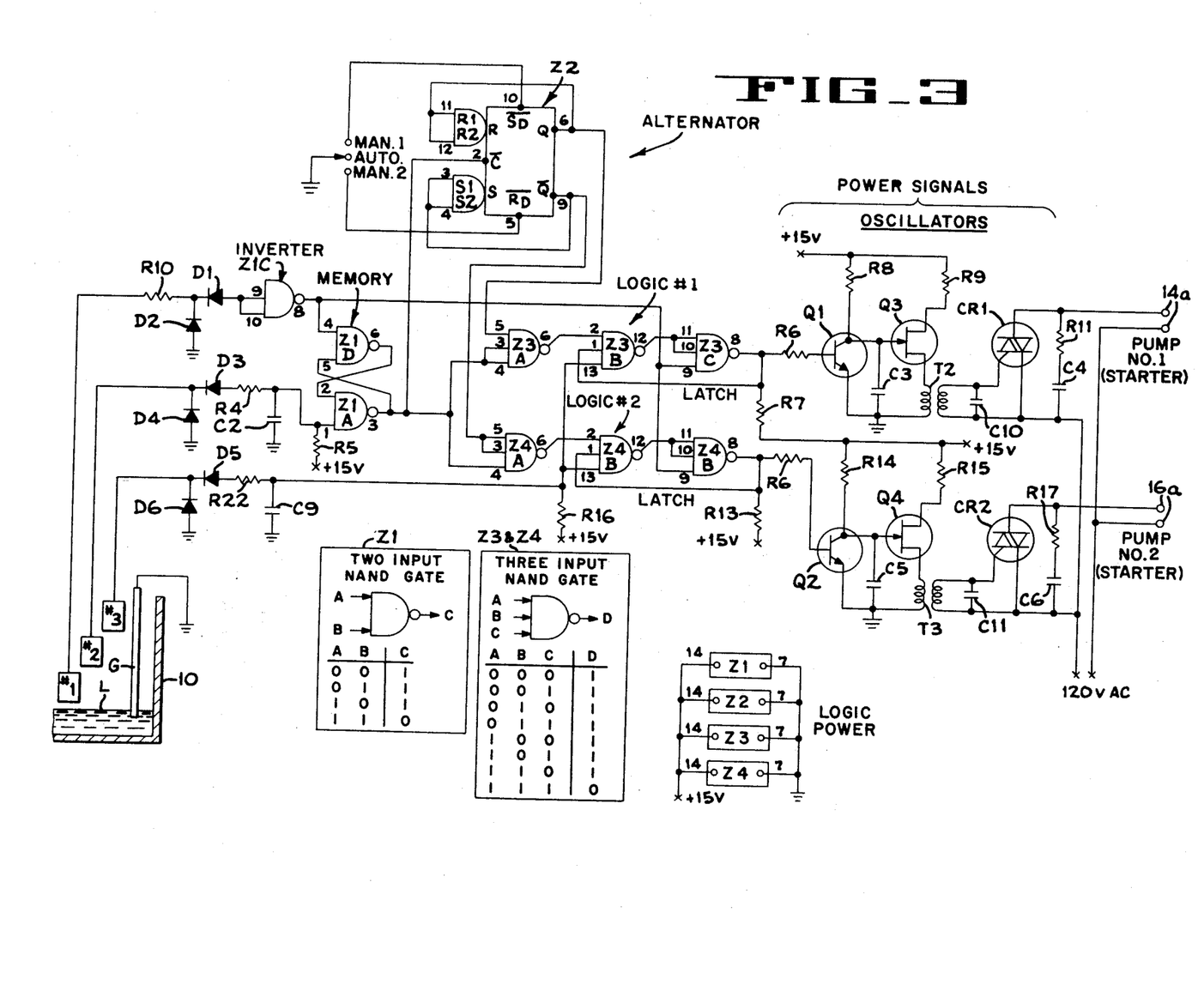
FIG. 3 is a schematic electrical diagram of the system of FIG. 1 and includes truth tables for the gates and other certain components.

FIG. 3 is a schematic diagram of the complete circuit showing the memory, alternator and logic circuits as well as the circuits for the power signals. In the schematic of FIG. 3, the inverter, memory and logic gates are indicated in accordance with the current convention in the electronic art. In the present example, these gates comprise assemblies of transistors and diodes as does the alternator assembly Z2. The inverter and memory gates Z1A, C and D are commercial components comprising two input, single output gates. The alternator Z2 is also a commercial component having at least four inputs and two mutually exclusive outputs which are flipped from one mutually exclusive state to another. The logic gates Z3, Z4 are likewise commercial components and are triple component, 3 input gates. In the example being give, these circuits are assembled from integrated circuit components commercially available, such as the units indicated on the drawing.

In the description that follows, the input and output signals for the various gates, etc. are designated as either "0" or "1." The "0" indication, in this example, indicates one state, which will be the state wherein the signal is grounded, or at approximately zero voltage. The "1" indication indicates the other state which will, in this example represent the state wherein the input or output is at supply voltage, such as positive 15 volts D.C.

The "truth trables" for gates Z1A, C and D and Z3, Z4 are also given on FIG. 3 for ready reference. The internal action of the alternator Z2 is not explained in detail, only its inputs and outputs are given, this being a commercially available unit, the internal details of which are not critical to the invention.

It will be noted that small numerals appear at the leads for the various gates, etc., in FIG. 3. These numerals are the terminal markings of the commercially available units (Motorola in this case) indicated on FIG. 3 and are merely given to expedite practice of the invention by those skilled in the art.

It will also be noted that transistors Q1 and Q2, unijunction transistors Q3, Q4 and triacs CR1, CR2 are also shown on the diagrams. These are also conventional units well known to those skilled in the art and a detailed description thereof is not essential to an understanding of the invention.

The functions of some of the electronic components of the circuit of FIG. 3 will now be mentioned briefly, although the heat of the invention lies in the arrangement of the memory, alternator and logic circuit components which will be described in sufficient detail for those skilled in the art to follow the circuit in connection with FIGS. 4 – 16.

It will be noted that diodes D1 to D6 are connected to the input leads from the probes. These are noise reduction diodes. The resistors R10, R4 and R22 in the probe leads are current limiting resistors, provided to meet Underwriter's Laboratory requirements. It will further be noted that the alternator has a Manual 1, Manual 2 and Automatic Switch. When this switch is set to Manual 1, the alternator is switched to the pump No. 1 operating condition. When switched to Automatic, the alternator remains in that condition unless triggered by the memory circuit. The converse operation occurs if the alternator is originally set to Manual No. 2 and then turned back to Automatic.

If the switch is left in either of its manual positions this will inhibit alternate pump operation.

The 15 volt supply voltage for the gates is supplied by a conventional filtered power supply not shown in the drawings in the interest of clarity. Load and bias resistors of the proper value are indicated in the diagram, taken in conjunction with the Table of Components.

The unijunction transistors Q3 and Q4, once turned on, are in a circuit which causes them to function as oscillators. The transistors Q1 and Q2 turn the oscillator unijunctions Q3 and Q4 on or off, the oscillators being off when the transistors are conducting (on) and on when the transistors are nonconducting (off).

When the signal from logic gate Z3C turns the transistor Q1 on, the capacitor C3 of the oscillator circuit for the unijunction transistors Q3 is shorted out by conduction of the transistors Q1. When the transistor Q1 is turned off by the input signal from the logic gate, (a start motor signal) the oscillator capacitor C3 is charged through resistor R8 from the 15 volt D.C. supply. The condenser C3 charges through the resistor R8 until the potential across it reaches about 0.68 of the 15 volt supply voltage, whereupon the unijunction Q3 is triggered to conduct. This provides a pulse on the primary of transformer T2 and discharges the condenser C3 through the transformer. The unijunction Q3 then turns off and the condenser C3 recharges. The circuit components are such that these effects occur at about 4000 cycles per second. The effect of this (so long as the gate transistor Q1 is turned off) is to provide a high frequency pulsating direct current from the transformer secondary to the input of the triac CR1. This pulse acts as a steady current, relative to the relatively slow oscillation of the triac power supply from its 50 – 60 cycle 120 volt AC line. Thus the aforesaid oscillation of the unijunction transistor Q3 turns the triac CR1 on, and hence provides a power signal to the starter for pump No. 1. The condenser C10 across the secondary of the transformer T2 is a noise filter and the resistor capacitor network R11, C4 across the triac CR1 is a conventional snubber network which controls the rate of change of voltage with respect to time, across the output. The oscillator and power signal circuits for the start of pump No. 2 operate in the same manner as that just described.

Step by Step Description

As previously mentioned, the drawings of FIGS. 4 – 16 represent simplified versions of the circuit shown in detail in FIG. 3 up to the power signal portion of the circuit.

In the diagrams of FIGS. 4 – 16, a small "0" by a lead indicates the grounded state and a small "1" indicates that the lead is placed substantially at the 15 volt D.C. supply voltage.

In the circuit shown, when the probes are not activated, that is not submerged in the liquid, their output leads are at the "1" state, whereas when the liquid touches a probe it is grounded and its lead assumes the "0" state.

Figure 4:
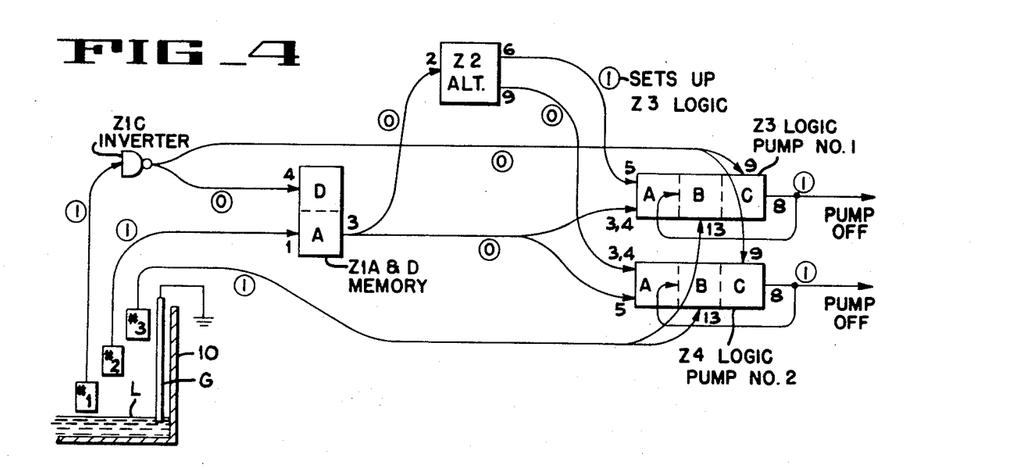
FIGS. 4 – 16 are simplified block diagrams of the system of FIGS. 1 and 3, illustrating the conditions described at various key points in the chart of FIG. 2.

In FIG. 4 the liquid is below all three probes and it will be assumed that the alternator Z2 is in condition to set up the logic for pump No. 1. This is attained by setting the manual automatic switch to Manual 1 and back to Automatic. The conditions of the various inputs and outputs through the gates (0 or 1) are indicated in FIG. 4 and will not described in detail, except to note that the output terminal 6 of the alternator Z2 is at condition 1 which sets up the logic channel Z3 for No. 1 pump operation. It will be further noted that in the logic circuit, a condition 1 at the outputs of the logics Z3, Z4 represent a pump off signal (as seen in FIG. 3 and the table of FIG. 17) because a 1 input to transistors Q1 and Q2 turns them on, giving the results previously described.

The manual switch is not an essential feature, other than providing for manual control of the pumps. The alternator will assume one or the other of its stable states when power is applied thereto without the manual switch. However, under these conditions there would be no way to choose the first of these states but this is not material.

In FIG. 5 and in remaining Figures, the previous states of the various inputs and outputs are indicated by small circles around their state indicating numerals. The new states, that is, those that have changed are indicated by the substitution of small squares around those numerals. Thus, in FIG. 5, the water level has reached probe No. 1 and the state of its output lead has changed from 1 (at supply voltage) to 0 (ground). The 0 signal to Z1C sets 1 into the memory gate Z1D. The 1 signal from the No. 1 probe inverter Z1C can also be considered as partially conditioning the logic Z3 for No. 1 pump operation. There is no change in the 0 signal to the alternator.

One Pump Operation

In FIG. 6, the water has reached probe No. 1. This changes the probe No. 2 input to the gate Z1A of the memory from 1 to 0 and flips the memory to produce an output signal of 1. Although flipping of the memory changes the input to terminal 2 of the alternator Z2 from 0 to 1, this alternator circuit is such that a change in the signal input to terminal 2 that is in the positive-going direction (from grounded to about 15 volts in this case) has no effect on the alternator output, and hence the logic for pump No. 1 remains conditioned for that pump's operation. However, the aforesaid flipping of the memory applies condition 1 to both logic channels Z3 and Z4. This results in a 0 signal from Z3, which turns on pump No. 1 and will remain on until all probes are again cleared by the liquid. The details of the latching signal can be traced from the table of FIG. 17 and the more complete diagram of FIG. 3.

Figure 7:
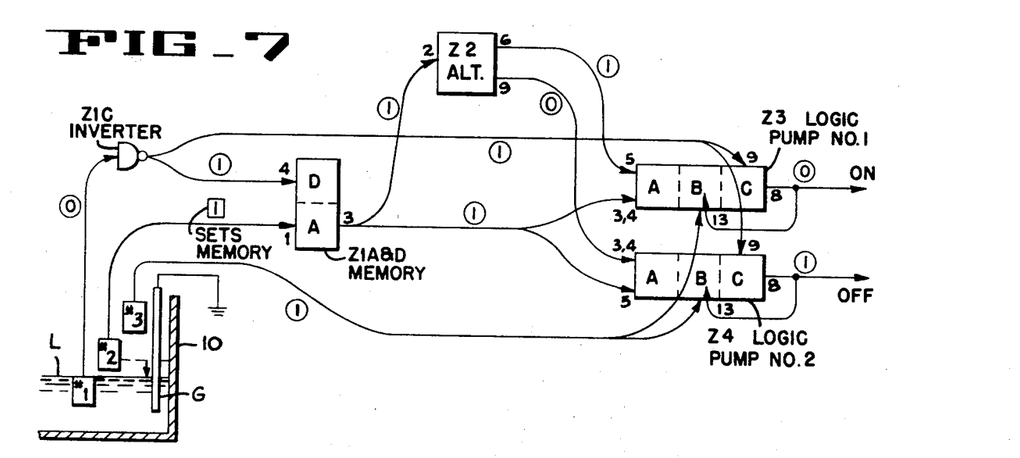

In FIG. 7, the capacity of pump No. 1 is adequate to bring the liquid level back below probe No. 2. This changes the No. 2 probe output signal to 1, which again sets the memory circuit. No other conditions of the circuit are changed in FIG. 7.

Figure 8:
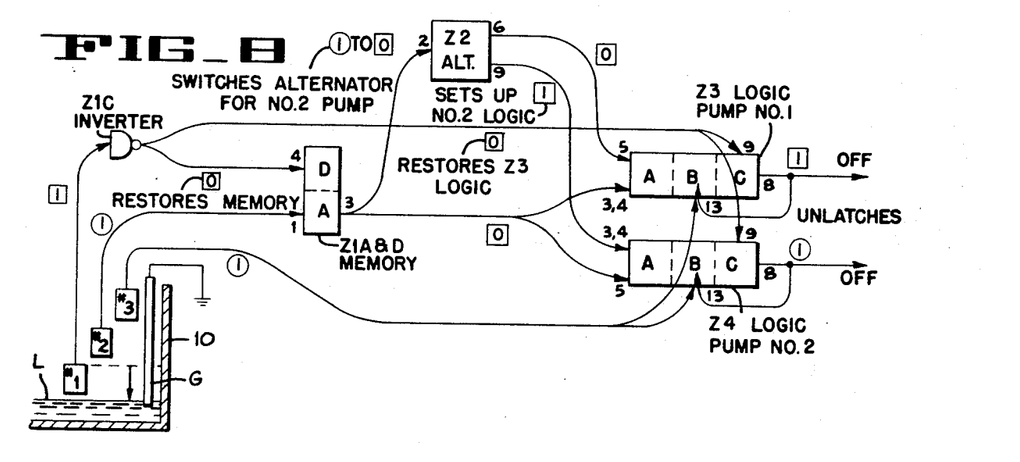

In FIG. 8 the liquid level has dropped below probe NO. 1 so that its output signal reverts to condition 1. The resulting 0 output from the Z1C inverter restores the memory, with which the output of the memory flips from condition 1 to condition 0. This represents a negative-going change in the memory signal to terminal 2 of the alternator Z2, and as previously described, the alternator is constructed so that the alternator outputs on terminals 6 and 9 now exchange states. The output terminal 6 of the alternator, which was previously at condition 1, now assumes condition 0; and the alternator output terminal 9, which was previously at condition, 0, now assumes condition 1. The new 0 signals from the probe No. 1 inverter, the memory and the alternator output terminal 6, change the output of logic Z3 to condition 1, which turns off pump No. 1 that was previously running and unlatches its logic circuit. The output of logic Z4 for pump No. 2 is unaffected throughout the cycles of operation just completed.

Two Pump Operation

Assuming a new cycle starts, the beginning thereof which appears in the diagram of FIG. 9, the liquid once again grounds (activates) probe No. 1, changing its output to condition 0. The resultant output signal 1 from the Z1C inverter sets the memory and conditions the channel Z4 logic for turning on pump No. 1.

In FIG. 10, the liquid level has reached probe No. 2 which flips the memory and also provides a 0 to 1 (positive-going) input to terminal 2 of the alternator Z2. As previously indicated, positive-going changes at this alternator input have no effect on its output. However, this same change in the output of the memory Z1 from 0 to 1 does flip the Z4 logic channel for the second pump to an output 0. This turns the second pump on and the logic circuit Z4 is also latched to keep the pump running until all probes have been deactivated.

Figure 11:
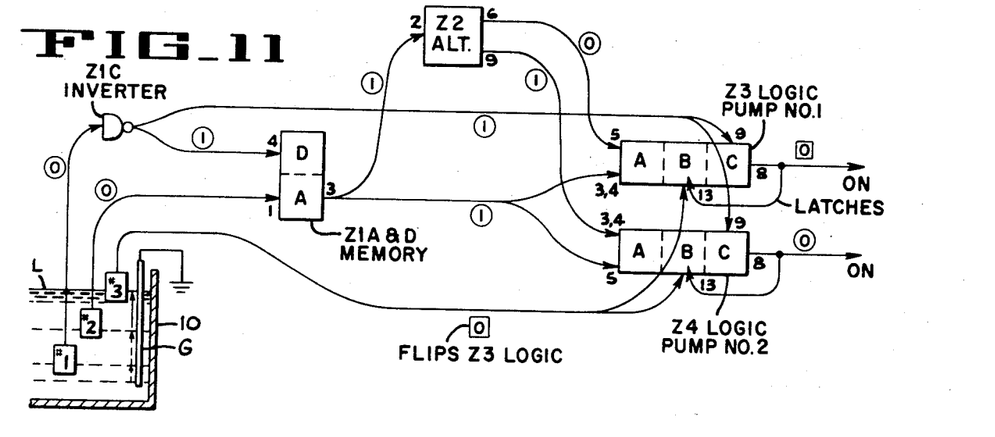

In FIG. 11 the liquid level has reached probe No. 3. This changes its output to condition 0 which flips the Z3 logic output to 0, turning on No. 1 pump. The Z3 logic latch circuit also operates at this time. Now both pumps are running, as was indicated in the charge of FIG. 2.

Figure 12:
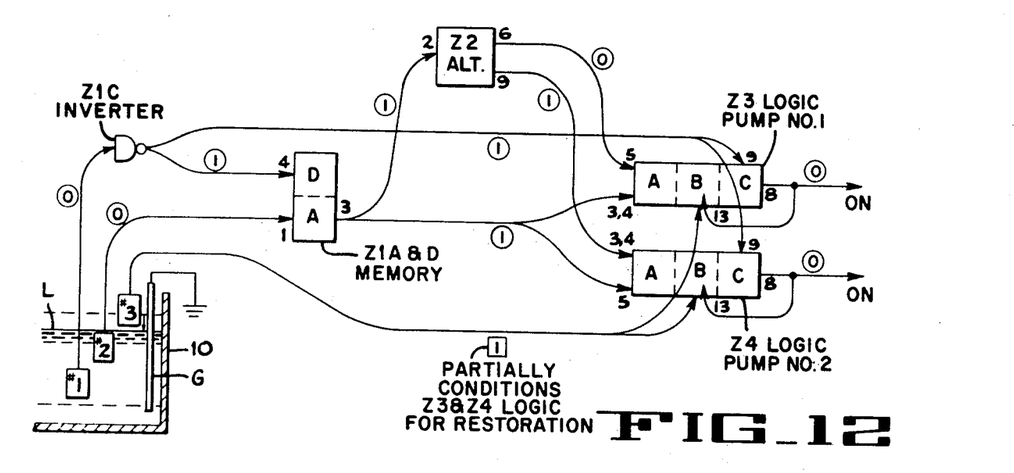

FIG. 12 shows the liquid level falling below probe No. 3 which changes its output to condition 1 and thus partially conditions the Z3 and Z4 logic channels for restoration to their pump off condition. However, these channels are latched so that there are no changes in their outputs at this time, and hence both pumps remain on.

Figure 13:
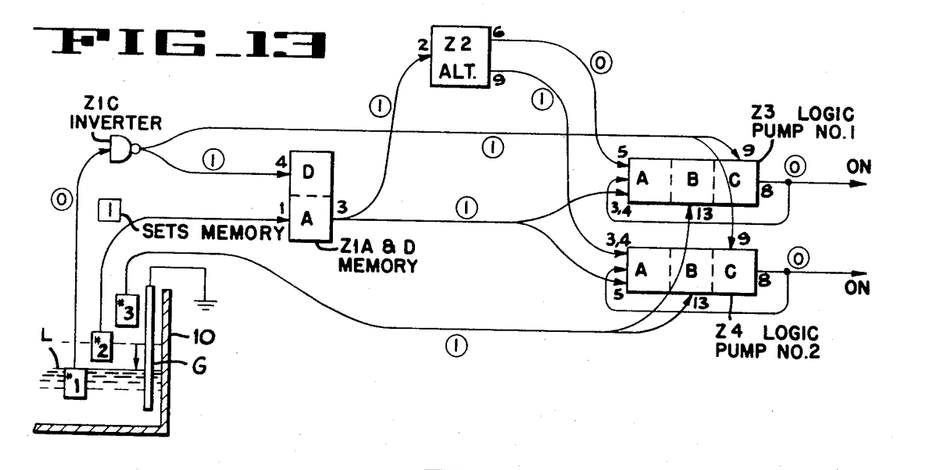

In FIG. 13 the liquid level has dropped below probe No. 2, the output of which reverts to condition 1. This sets the memory via gate Z1A, but there are no other changes and both pumps remain on.

In FIG. 14 the liquid level again falls below probe No. 1 and a number of changes are thereby effected. The change of the output of probe No. 1 to condition 1 provides a condition 0 output from its inverter Z1C. This restores the memory back to its initial condition so that the memory output changes from 1 to 0 and hence presents a negative-going input to the alternator Z2. The alternator outputs now switch back to condition 1 on terminal 6 and 0 on terminal 9 which sets up the Z3 logic for future pump No. 1 operation. However, the new 0 state outputs from both the memory and the probe No. 1 Z1C inverter to the Z3 and Z4 logic circuits restore these circuits to their initial condition of providing a condition 1 output signal. This turns off both pumps and unlatches the logic circuits.

Vacillation about probe No. 1

In FIG. 15 the liquid level has again risen to probe No. 1. This sets the memory and conditions the Z3 logic for No. 1 pump operation but has no effect on the logic circuit outputs nor on the alternator.

Figure 16:
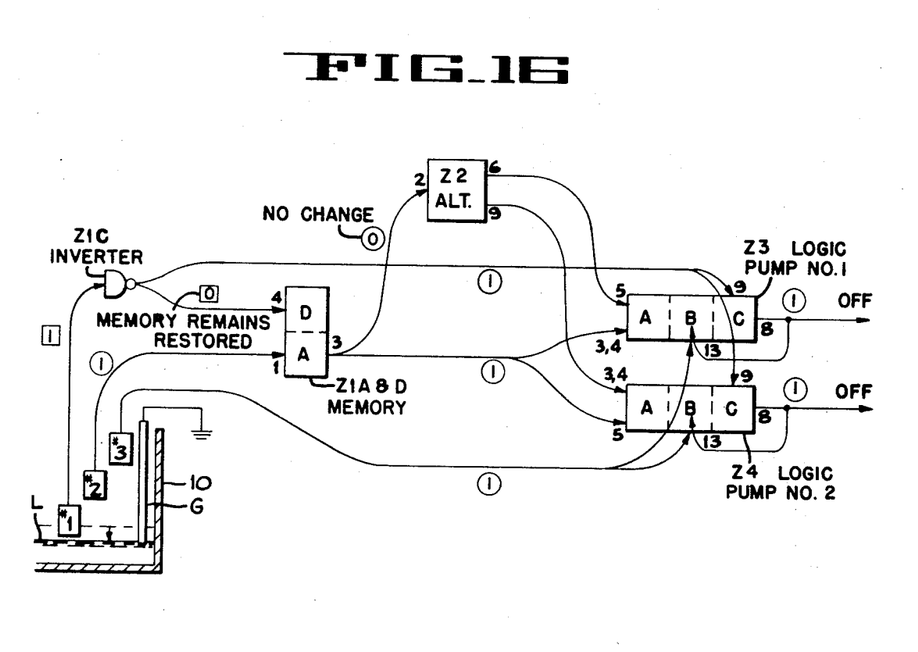

In FIG. 16 the liquid level has again fallen below probe No. 1 (without reaching probe No. 2) which changes the inputs to Z1D of the memory back to 0, but the memory output remains in its restored condition of 0. Thus, liquid vacillation about probe No. 1 produces no change in the alternator outputs or in the logic circuits and the alternator remains set for future No. 1 pump operation, corresponding to the conditions shown in FIG. 14, when the liquid level first dropped below probe No. 1.

Thus, as a result of the circuit just described it can be seen that the liquid level must rise past probe No. 1, and continue up to probe No. 2 before either pump will perform; that the level must drop below probe No. 1 before any operating pump is turned off and before the alternator is switches; and that vascillation of the liquid level about the lowest probe does not switch the alternator.

The table of FIG. 17 represents a more detailed tracing of the steps shown in the chart of FIG. 2 and in FIGS. 4 – 16, with the input and output conditions being given for each of the gate terminals at each phase of the operation. Thus, the complete circuit can be traced through as a detailed guide to utilizing the principles of the present invention. For ease of following (except for reference to the conditions of pumps No. 1 and 2) in the table of FIG. 17 circuit condition figures (0 or 1) have only been entered in the table when a change of state of the various input and output terminals is produced. In other words, in order to read the conditions at any gate or the like in the table of FIG. 17 in any horizontal line, reference must be made to any state indications actually appearing in that line, plus the last entered indications in lines above the line under investigation.

Modification

Figure 1A:
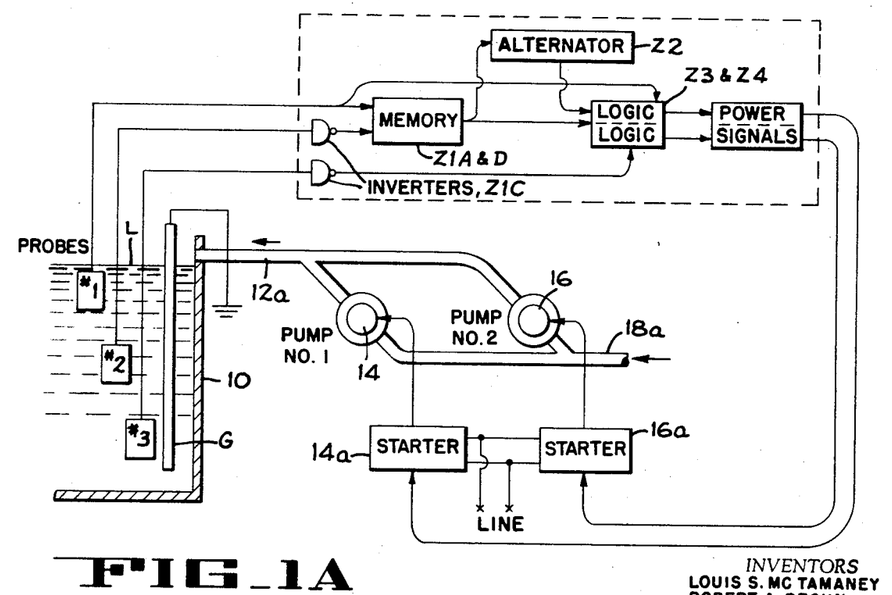
FIG. 1A is a similar block diagram of the system rearranged to keep a tank filled.

FIG. 1A shows an embodiment of the invention which is substantially the same as that previously described except that the probes and pumps are arranged to keep the tank filled above probe No. 1 (which is now the highest probe); to turn on one pump if the probe drops below probe No. 2 and both pumps if the level drops below probe No. 3 (which is now the lowest probe). Basically, the only change necessary in the circuit for this type of operation, wherein the probes are now "activated" by the water liquid level clearing the probes instead of by grounding them, is that of removing the inverter Z1C from the probe No. 1 lead and putting similar inverters in the leads from probe No.'s 2 and 3.

Having completed a detailed description of the invention so those skilled in the art may practice the same, it is believed apparent how the features of the invention previously described are obtained by the aforesaid preferred embodiment and how the features can be used to either maintain a tank from being overfilled or to prevent it from becoming empty.

Although it is preferred that the various gates and logic circuits disclosed herein be made up of commercially available solid state components (and preferably as integrated circuit assemblies) it will be obvious from those skilled in the art that the commercial assemblies illustrated and described in detail herein can be manufactured from individual components in accordance with the instruction sheets printed fro those commercial components to obtain an identical mode of operation of that herein described.

In fact, the state of the art in logic and gate circuitry is such that a worker skilled in the art can develop a circuit having the mode of operation of that described in detail herein, by merely examining the conditions given in the table of FIG. 17, and in face the conditions given in the diagrams of FIGS. 4 – 16 are adequate for the purpose.

TABLE OF COMPONENTS

| | |
|---|---|
| D1 – D6 | Diode IN 914 |
| R4, R10, R22 | 1K |
| R5, R16 | 1K |
| R7, R13 | 4.7K |
| R8, R14 | 5.6K |
| R9, R15 | 270 ohms |
| R11, R17 | 3.9 K |
| C2, C9 | 0.1 mf |
| C3, C5 | 0.027 mf |
| C4, C6 | 0.05 mf |
| C10, C11 | 0.1 mf |
| Q1, Q2 | Transistor 2N4124 |
| Q3, Q4 | Unijunction transistor 2N 4871 |
| Cr-1, CR-2 | Triac, RCA 40510 |
| T2, T3 | Pulse Transformer Pulse Engineering PE 9102 |
| Z1A, C + D | Motor MC 668 P Quad, 2 input Gates (Three Sections Shown) |
| Z2 | Motorola MC 664 P Master-Slave R-S Flip Flop |
| Z3A, B + C | Motorola MC 670 P |
| Z4A, B + C | |
| Triple 3-input Gate | |

Although the best mode contemplated for carrying out the present invention has been herein shown and described it will be apparent that modification and variation may be made without departing from what is regarded to be the subject matter of the invention.

We claim:

1. A liquid level control system of the type having two motorized pumps for changing the level in a confined body of liquid, a plurality of electric probes at staggered heights for providing liquid level signals, and control circuit means for initiating a power signal to start one of said pumps after said first two probes have been successively activated and having alternator means for alternately energizing said pumps as the liquid level activates the probes, said pumps remaining energized until all probes are deactivated; the improvement wherein said control circuit means comprises electronic means controlled by said probes and connected to said alternator means for changing the state of said alternator means, said control circuit means providing a switching signal for alternate pump operation only after the first two probes have been successively activated and then deactivated by rise and fall of the liquid level to thereby insure pure 50 percent alternation.

2. A liquid level control system of the type having two motorized pumps for changing the level in a confined body of liquid, a plurality of electric probes at staggered heights for providing liquid level signals, and control circuit means for alternately energizing said pumps as the liquid level activates the probes, said pumps remaining energized until all probes are deactivated; the improvement wherein said control circuit means comprises memory circuit means connected to a first probe disposed for one extreme level condition and to an adjacent second probe, alternator circuit means connected to the output of said memory circuit means for providing switching signal outputs, logic circuit means connected to the outputs of both said memory circuit means and said alternator circuit means, and power signal circuit means connected to the output of said logic circuit means for starting and stopping said pumps, said logic circuit means initiating a power signal to start one of said pumps after said first two probes have been successively activated, said memory circuit means providing a switching signal to said alternator circuit means only after said first two probes have been successively activated and deactivated to thereby insure pure 50 percent pump alternation.

3. The system of claim 2, wherein said memory circuit means comprises cross-connected gates with one gate connected to each probe to provide a bistable flip flop output.

4. The system of claim 3, wherein said alternator circuit means also comprises a bistable flip flop circuit with two mutually exclusive outputs and is responsive to only one of the two changes of state of said memory circuit flip flop output.

5. The system of claim 4, wherein said logic circuit means comprises a set of sequential gates for each pump with the memory and alternator outputs connected to one gate of each set and with the first probe connected to another gate of each set.

6. The system of claim 5 wherein a third probe is adjacent said second probe and is connected to another gate of each logic circuit set for turning on both pumps when the third probe is activated.

7. The system of claim 5, wherein said logic circuit means includes a circuit for latching the pumps in their energized condition until the first probe has been deactivated.

8. The system of claim 1, wherein said probes are connected as simple grounding elements via the liquid, said memory, alternator and logic circuit means are made up of solid state gate assemblies.

9. A liquid level control system of the type having two motorized pumps for changing the level in a confined body of liquid, a plurality of electric probes at staggered heights for providing liquid level signals, and a control circuit comprising means for initiating a power signal to start one of said pumps after said first two probes have been successively activated and an alternator for alternately energizing said pumps as the liquid level successively activates the probes, said pumps remaining energized until all probes are deactivated; the improvement wherein said alternator comprises a bistable, two output flip flop circuit connected to said first two probes, a two channel logic gate connected to said probes and to said alternator outputs for providing individual pump turn on signals, an oscillator circuit for each pump that can be turned on and off by one of said logic gates, and a D.C. controlled rectifier of A.C. power of each pump that is turned on and off by one of said oscillator circuits for providing pump on and off control signals, said oscillator circuit frequencies being several times higher than the frequency of said A.C. power.

* * * * *

PO-1050
(5/69)

UNITED STATES PATENT OFFICE
CERTIFICATE OF CORRECTION

Patent No. 3,741,683        Dated June 26, 1973

Inventor(s) LOUIS S. McTAMANEY, et al

It is certified that error appears in the above-identified patent and that said Letters Patent are hereby corrected as shown below:

Col.1, line 9, change "united" to -- United --.
Col.1, line 27, change "united" to -- United --.
Col.1, line 35 change "cook" to -- Cook --.
Col.2, line 24, change "(traic)" to -- (triac) --.
Col.3, line 68, change "No. 1" to -- No. 2 --.
Col.4, line 16, change "NO.1" to -- No. 1 --.
Col.4, line 32, change "has" to -- had --.
Col.4, line 37, change "NO." to -- No. --.
Col.4, line 50, change "NO.2" to -- No. 2 --.
Col.5, line 43, change "truth trables" to -- truth tables --.
Col.5, line 63, change "heat" to -- heart --.
Col.6, line 58, change "start" to -- starter --.
Col.7, line 47, change "No. 1" to -- No. 2 --.
Col.8, line 2, change "NO.1" to -- No. 1 --.
Col.8, line 12, delete the comma after "condition".
Col.10, line 8, change "fro" to -- for --.
Col.10, line 15, change "face" to -- fact --.
Col.10, line 29, change "Cr-1" to -- CR-1 --.
Col.10, line 36, after "Z4A,B+C", insert -- Triple 3 input Gate -- under "motorola MC670P".
Col.10, line 37, cancel "Triple 3-input Gate"
Col.10, line 32, change "Motor" to -- Motorola --.
Col.10, line 62, after "percent" insert -- pump --.
Col.12, line 10, before "said" insert -- and --.
Col.12, line 29, change "of" to -- for --.

Signed and sealed this 11th day of March 1975.

(SEAL)
Attest:

RUTH C. MASON
Attesting Officer

C. MARSHALL DANN
Commissioner of Patents
and Trademarks